US007212893B2

(12) United States Patent
Doherty et al.

(10) Patent No.: US 7,212,893 B2
(45) Date of Patent: May 1, 2007

(54) NETWORK CAR ANALYZER

(75) Inventors: James M Doherty, Georgetown, TX (US); Thomas Lee Adams, Austin, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 117 days.

(21) Appl. No.: 11/160,158

(22) Filed: Jun. 10, 2005

(65) Prior Publication Data

US 2005/0228560 A1 Oct. 13, 2005

Related U.S. Application Data

(63) Continuation of application No. 10/249,820, filed on May 9, 2003, now Pat. No. 6,920,381.

(51) Int. Cl.
*G01M 17/00* (2006.01)

(52) U.S. Cl. ............................ 701/33; 701/29; 701/32

(58) Field of Classification Search .................. 701/24, 701/25, 29, 30, 33, 34, 35; 73/116, 117.2; 705/1, 16
See application file for complete search history.

(56) References Cited

U.S. PATENT DOCUMENTS

| | | | | |
|---|---|---|---|---|
| 4,989,146 | A | 1/1991 | Imagjo | 364/424.04 |
| 5,442,553 | A | 8/1995 | Parrillo | 364/424.04 |
| 5,445,347 | A | 8/1995 | Ng | 246/169 |
| 5,491,631 | A | 2/1996 | Shirane et al. | 364/424.04 |
| 5,590,040 | A | 12/1996 | Abe et al. | 364/424.04 |
| 5,781,125 | A | 7/1998 | Godau et al. | 340/870.01 |
| 5,884,202 | A | 3/1999 | Arjomand | 701/29 |
| 5,912,941 | A | 6/1999 | Schmitt | 378/91 |
| 6,181,994 | B1 | 1/2001 | Colson et al. | 701/33 |
| 6,339,736 | B1 | 1/2002 | Moskowitz et al. | 701/29 |
| 6,526,335 | B1 | 2/2003 | Treyz et al. | 701/1 |
| 6,711,474 | B1 | 3/2004 | Treyz et al. | 701/1 |
| 6,732,031 | B1 | 5/2004 | Lightner et al. | 701/33 |
| 6,735,503 | B2 | 5/2004 | Ames | 701/29 |
| 6,745,151 | B2 | 6/2004 | Marko et al. | 702/182 |
| 2002/0019725 | A1 | 2/2002 | Petite | 702/188 |
| 2002/0027504 | A1 | 3/2002 | Davis et al. | 340/540 |
| 2002/0031101 | A1 | 3/2002 | Petite et al. | 370/310 |
| 2002/0059046 | A1 | 5/2002 | Mifune et al. | 702/188 |
| 2002/0059156 | A1 | 5/2002 | Hwang et al. | 706/45 |

*Primary Examiner*—Richard M. Camby
(74) *Attorney, Agent, or Firm*—Ramraj Soundararajan; IP Authority, LLC.

(57) ABSTRACT

An automobile's maintenance port is wirelessly connected (for example, via an IEEE 802.11-based connection) to a plurality of gateways/routers that forward automobile diagnostic data (such as a series of diagnostic codes) to a server. Each gateway interfaces with two networks—a first wireless network for wireless communications with an automobile and a second network to communicate with the server. The server implements computer readable program code that aids in receiving forwarded automobile diagnostic data and analyzing the data to identify malfunctions. The server sends the analyzed data or a report based on the analyzed data to a subscriber-defined location (e.g., a PC with access to the Internet). Alternatively, the server can render an indication in the automobile to inform a user that the generated report is ready for electronic retrieval.

16 Claims, 4 Drawing Sheets

NETWORK CAR ANALYZER

RELATED APPLICATION

This application is a continuation of U.S. patent application Ser. No. 10/249,820 filed May 9, 2003 (issued as U.S. Pat. No. 6,920,381 on Jul. 19, 2005) which is incorporated herein by reference in its entirety.

BACKGROUND OF INVENTION

The present invention relates generally to the field of wireless transmissions. More specifically, the present invention is related to wireless transmissions of vehicle diagnostic data.

DISCUSSION OF PRIOR ART

An On-Board Diagnostic, or OBD, system is a computer-based system that was developed by automobile manufacturers to monitor the performance of various components of an automobile's engine, including emission controls. Upon detection of any malfunction, the OBD system provides the owner of the automobile with an early warning (e.g., check engine light in the dashboard of an automobile). OBD was primarily introduced to meet EPA emission standards but, through the years, on-board diagnostic systems have become more sophisticated. For example, OBD-II, a standard introduced in the mid-'90s and implemented in light-duty cars and trucks, provides a plurality of sensors to monitor malfunctions with engine, chassis, body, and accessory devices.

In a simple scenario, the OBD system detects a malfunction in the engine (or any other component that is monitored by sensors of the OBD system) and signals a warning indicative of such a malfunction. For example, a "check engine" light could be illuminated in an automobile's dashboard indicative of such a malfunction. The automobile's owner, upon noticing such a warning indicator, makes plans for taking the automobile to a service station where the malfunction can be further investigated. Upon arrival at the service station, repair personnel connect a cable that serves as a communication link between the automobile's diagnostic port and a computing device (such as a laptop). Next, the computing device decodes OBD-II system signals (such as diagnostic codes received via the diagnostic port) and presents them to the service station personnel, who then make a decision on how to fix the malfunction.

However, the disadvantage in such a scenario is that the automobile's owner is unaware of the precise nature of the malfunction. For example, the automobile's owner is at a disadvantage in making decisions, such as whether or not to take the automobile to the service station immediately or if it is acceptable to take the automobile at a later time that is more convenient to the automobile's owner. Furthermore, the automobile's owner is also at a disadvantage in not knowing if the repair personnel at the service station are dependable to work on and bill him/her for only the services that were warranted (i.e., warranted based on data received from the automobile's diagnostic port). Thus, the automobile's owner is unaware if the service station over-charges him/her for services that were not required.

Another disadvantage with such a scenario is the need for significant investment by service stations for purchasing scanning equipment that is able to dock with an automobile's maintenance port to diagnose problems using a system such as the OBD II system.

The following references provide a general teaching in the area of vehicle diagnostics, but they fail to provide for the system or method of the claimed invention.

The U.S. patent to Ng (U.S. Pat. No. 5,445,347) provides for an automated wireless preventive maintenance monitoring system for magnetic levitation trains and other vehicles. Disclosed are sensors for monitoring the operational status or conditions of cars of a train. The maintenance control center generates a prognosis of the operating conditions of the cars, in accordance with the data signals received from the cars, and schedules maintenance actions based on the prognosis.

The U.S. patent to Godau et al. (U.S. Pat. No. 5,781,125) provides for an arrangement for the wireless exchange of data between a servicing device and a control unit in a motor vehicle. Disclosed is a radio or infrared transmitting and receiving unit that is part of a radio or infrared transmission path to a servicing device.

The patent to Arjomand (U.S. Pat. No. 5,884,202) provides for a modular wireless diagnostic test and information system. Disclosed is a computer-based apparatus providing access to complex technical information used to maintain and repair a motor vehicle.

The patent to Schmitt (U.S. Pat. No. 5,912,941) provides for a communication system for use in diagnosis of an apparatus. Disclosed is a diagnostic procedure enabled at the location of an apparatus (e.g., medical apparatus) by providing a transmitter that wirelessly communicates with a central station.

The patent to Colson et al. (U.S. Pat. No. 6,181,994 B1) provides for a method and system for vehicle initiated delivery of advanced diagnostics based on the determined need by vehicle. Network vehicles communicate with diagnostic centers over a link such as cellular or wireless.

The patent to Moskowitz et al. (U.S. Pat. No. 6,339,736 B1) provides for a system and method for the distribution of automotive services. Disclosed is an in-vehicle electronic system comprising an in-vehicle computing system having diagnostics capability. The diagnostic data is transmitted to a remote service center via a communication link.

The patent application publication to Petite (2002/0019725 A1) provides for wireless communication networks for providing remote monitoring, via sensors, of devices on a network.

Whatever the precise merits, features, and advantages of the above-cited references, none of them achieves or fulfills the purposes of the present invention. Thus, what is needed is an economical and user-friendly means for scanning and diagnosing ODB II system codes. Additionally, what is needed is a system that provides both automobile users and service station personnel with engine diagnosis data. The present invention's system and method overcome the above-mentioned disadvantages by providing for a network car analyzer that is able to receive automobile diagnostic codes from a plurality of gateways (physically dispersed at pre-determined locations) over a network wherein each of the gateways is able to wirelessly receive, via a protocol such as IEEE 802.11, diagnostic codes from an automobile's diagnostic port. A brief description of various IEEE 802.11 protocols is provided below.

802.11 refers to a family of specifications developed by the Institute of Electrical and Electronics Engineers (IEEE) for wireless local area network (LAN) technology. 802.11 specifies an over-the-air interface between a wireless client and a base station or between two wireless clients. There are several specifications in the 802.11 family, some of which are described below:

802.11—applies to wireless LANs providing 1 or 2 Mbps transmission in the 2.4 GHz band using either frequency hopping spread spectrum (FHSS) or direct sequence spread spectrum (DSSS).

802.11a—an extension to 802.11 that applies to wireless local area networks (LANs) and provides up to 54 Mbps in the 5 GHz band. 802.11a uses an orthogonal frequency division multiplexing encoding scheme rather than FHSS or DSSS.

802.11b—also referred to as 802.11 High Rate or Wi-Fi (for wireless fidelity), formed as a ratification to the original 802.11 standard, allows wireless functionality comparable to the Ethernet. This is an extension to 802.11, which applies to wireless LANs and provides 11 Mbps transmission (with fallback to 5.5, 2, and 1 Mbps) in the 2.4 GHz band. Transmission in the 802.11b standard is accomplished via DSSS.

802.11g—applies to wireless LANs and provides 20+ Mbps in the 2.4 GHz band.

The most popular of the above standards is the 802.11b.

SUMMARY OF THE INVENTION

The present invention provides for a plurality of gateways dispersed at predetermined physical locations offering subscribers network based automobile diagnostic services. According to the present invention, each gateway comprises at least a first interface and a second interface. The first interface communicates with a first wireless network (e.g., an 802.11-compliant network) and is capable of establishing a wireless communication link over the first wireless network with at least one automobile diagnostic port to wirelessly receive automobile diagnostic data. Automobile diagnostic data according to the present invention comprises a set of automobile diagnostic codes in conformity with a diagnostic standard (open basic diagnostic 2 (OBD2) standard). The second interface communicates with a second network (e.g., TCP/IP-based network such as the Internet) and is capable of forwarding the received automobile diagnostic data over the second network to a server, wherein the server receives and analyzes the forwarded automobile diagnostic data and provides feedback (to, for example, a subscriber-defined location) regarding conditions that require immediate attention.

The present invention also provides for a computer usable medium having computer readable program code embodied therein to implement the above-described method.

The present invention also provides for a computer usable medium having computer readable program code embodied therein to analyze automobile diagnostic data received via a gateway (among a plurality of gateways located at a predefined locations), wherein the gateway wirelessly receives the automobile diagnostic data from an automobile.

In one embodiment, the computer usable medium comprises computer readable code to aid in the reception of the automobile diagnostic data, analyze the received data to identify indications of malfunctions, and aid in the forwarding of such indications to one or more subscriber-defined locations.

In another embodiment, the computer usable medium comprises computer readable code to aid in the reception of the automobile diagnostic data, analyze the received data to identify indications of malfunctions, generate a report with such indications of malfunction, and aid in the forwarding of the report to a computer-based device with access to the Internet, wherein the computer-based device accesses the report to provide diagnosis of automobile-related malfunctions.

In yet another embodiment, the computer usable medium comprises computer readable code to aid in the reception of the automobile diagnostic data, analyze the received data to identify indications of malfunctions, generate a report with such indications of malfunction, and rendering an indication (e.g., an audio message or a visual indicator) in the automobile informing the user of the automobile that the report is ready for electronic retrieval (e.g., via the Internet).

DESCRIPTION OF THE PREFERRED EMBODIMENTS

Figure 1:
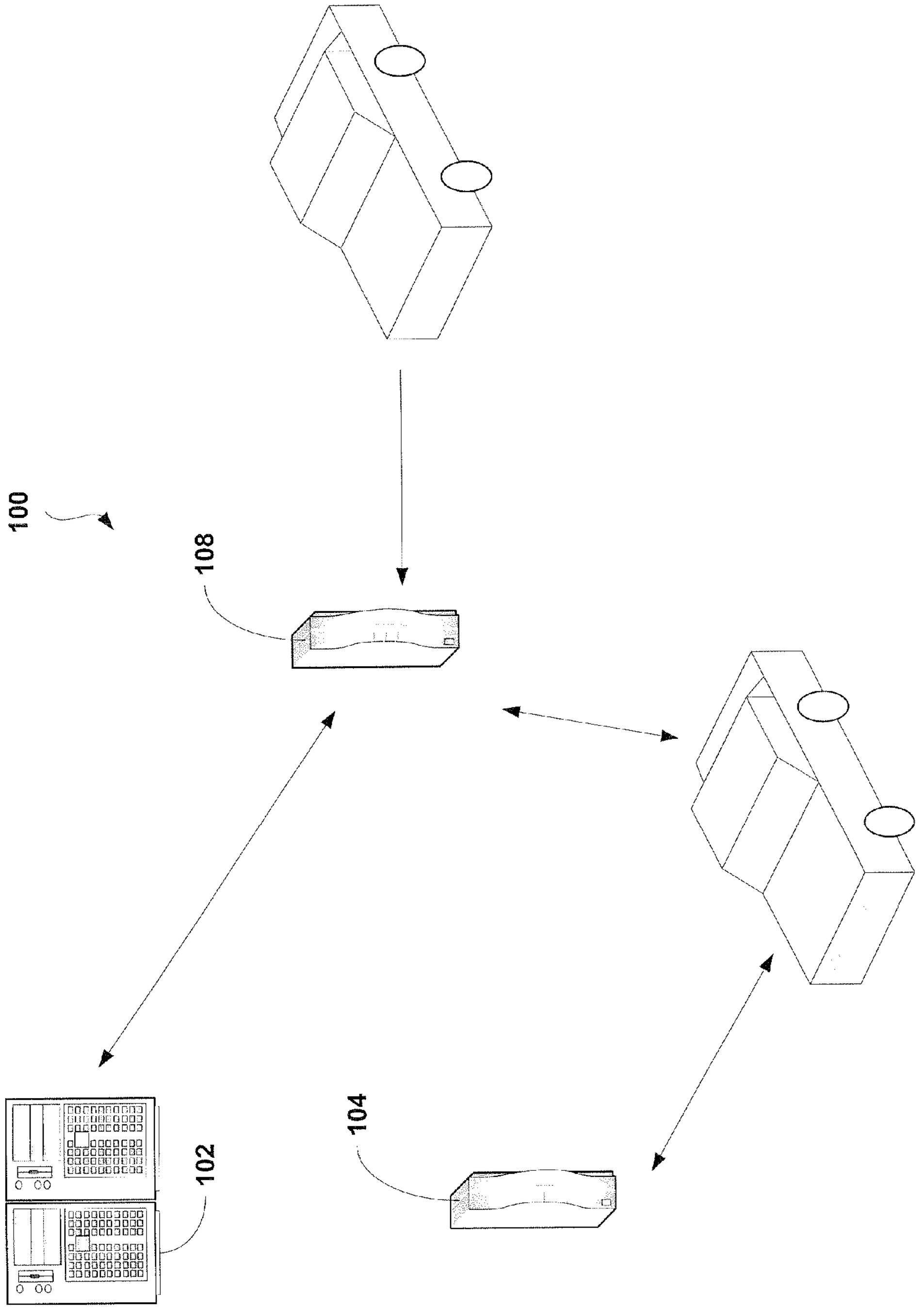
FIG. 1 illustrates an overview of a system associated with the present invention's network car analyzer.

While this invention is illustrated and described in a preferred embodiment, the invention may be produced in many different configurations. There is depicted in the drawings, and will herein be described in detail, a preferred embodiment of the invention, with the understanding that the present disclosure is to be considered an exemplification of the principles of the invention and the associated functional specifications for its construction and is not intended to limit the invention to the embodiment illustrated. Those skilled in the art will envision many other possible variations within the scope of the present invention.

FIG. 1 illustrates an overview of system 100 associated with the present invention's network car analyzer. System 100 comprises a network analyzer server 102 able to communicate, via a network (such as a local area network, a wide area network, or the Internet), with a plurality of gateways/routers 104, 108 located at various pre-determined physical locations.

Figure 2:
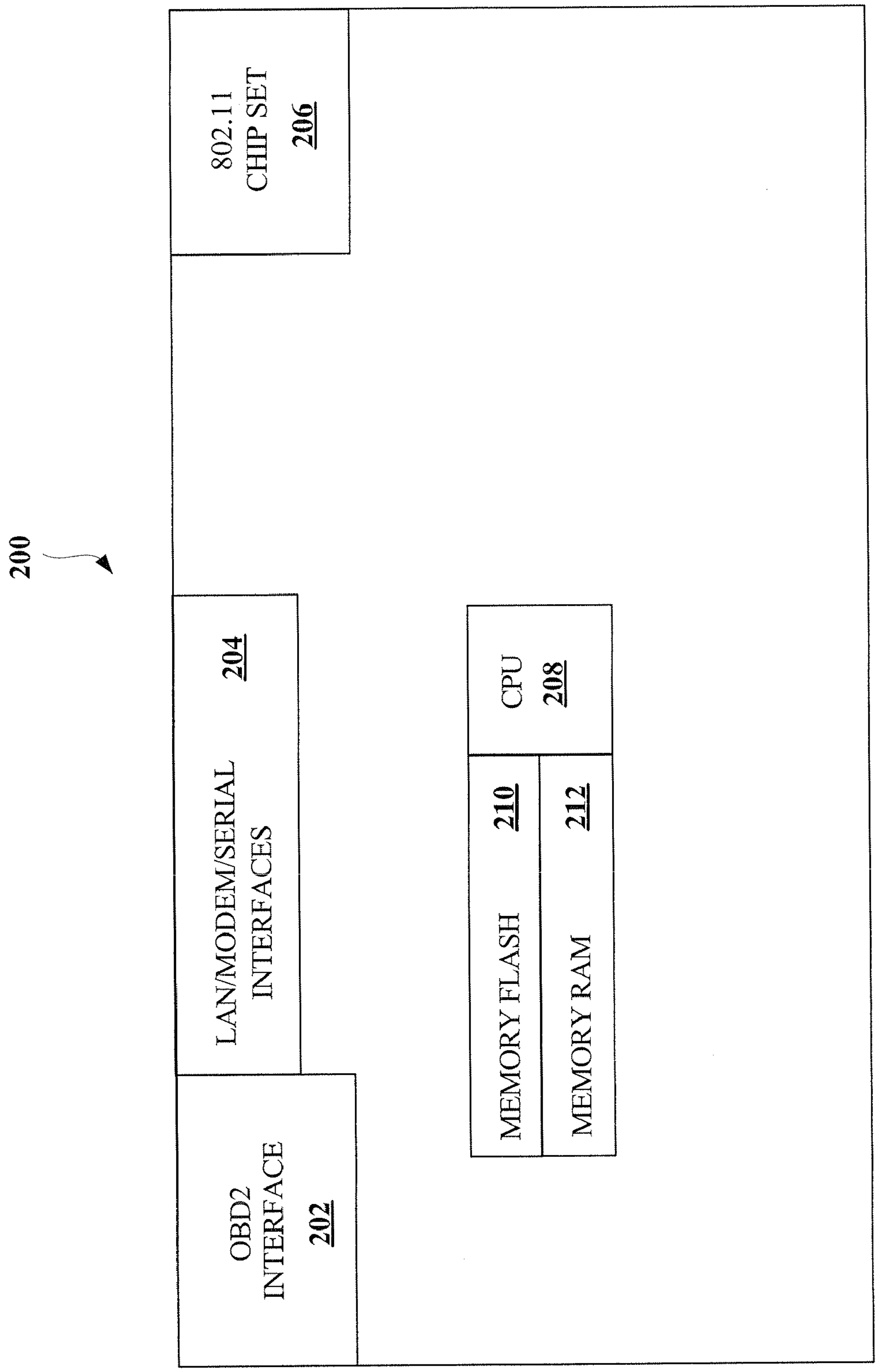
FIG. 2 illustrates an example of a wireless transmitter device that uses a single board computer running a real-time operating system (RTOS) like embedded Linux™.

Based upon the present invention, a subscriber of network analyzing services drives an automobile to one of the gateway/routers 104, 108 and physically attaches a wireless transmitter device to an automobile's diagnostic port, wherein the device is capable of receiving diagnostic data and formatting the received diagnostic data for wireless transmission via gateways/routers 104, 108. In the preferred embodiment, the diagnostic data comprises a series of diagnostic codes compliant with the ODB II standard. FIG. 2 illustrates an example of a wireless transmitter device that uses a single board computer 200 running a real-time operating system (RTOS) like embedded Linux™. The single board computer 200 comprises a plurality of interfaces (e.g., OBD2 interface 202 and LAN/modem/serial interface 204), an 802.11 chipset 206 for facilitating wireless communication, and a processor 208 operatively linked with memory modules (e.g., flash memory 210 or RAM memory 212).

It should be noted that, for discussion purposes, although a wireless transmitter device is described as being physically attached to the automobile's diagnostic port, other variations are envisioned, including one wherein the automobile's diagnostic port is modified to permanently attach the wireless transmitter device that can be activated either manually or automatically to wirelessly transmit diagnostic data to the network analyzer server via the gateways/routers at various physical locations.

Network analyzer server 102 is a server capable of receiving the forwarded automobile diagnostic data, wherein the server analyzes the forwarded automobile diagnostic data and provides feedback regarding conditions that require attention. The network analyzer server 102 forwards the diagnostic data to appropriate locations (such locations can be preset by subscribers, i.e., such as a mechanic's diagnostic computing device, hot-spots where such information could be forwarded (e.g., diagnostic data can be forwarded to a plurality of hot-spots located on Interstates and other roadways, a subscriber's personal computer, etc.). However, it should be noted that the location where such analyzed data is received should not be used to limit the scope of the present invention. It should be noted that although the network analyzer server 102 is shown as a singular entity, other scenarios falling within the scope of the present invention are envisioned, including embodiments wherein more than one network analyzer servers are connected across networks.

Figure 3:
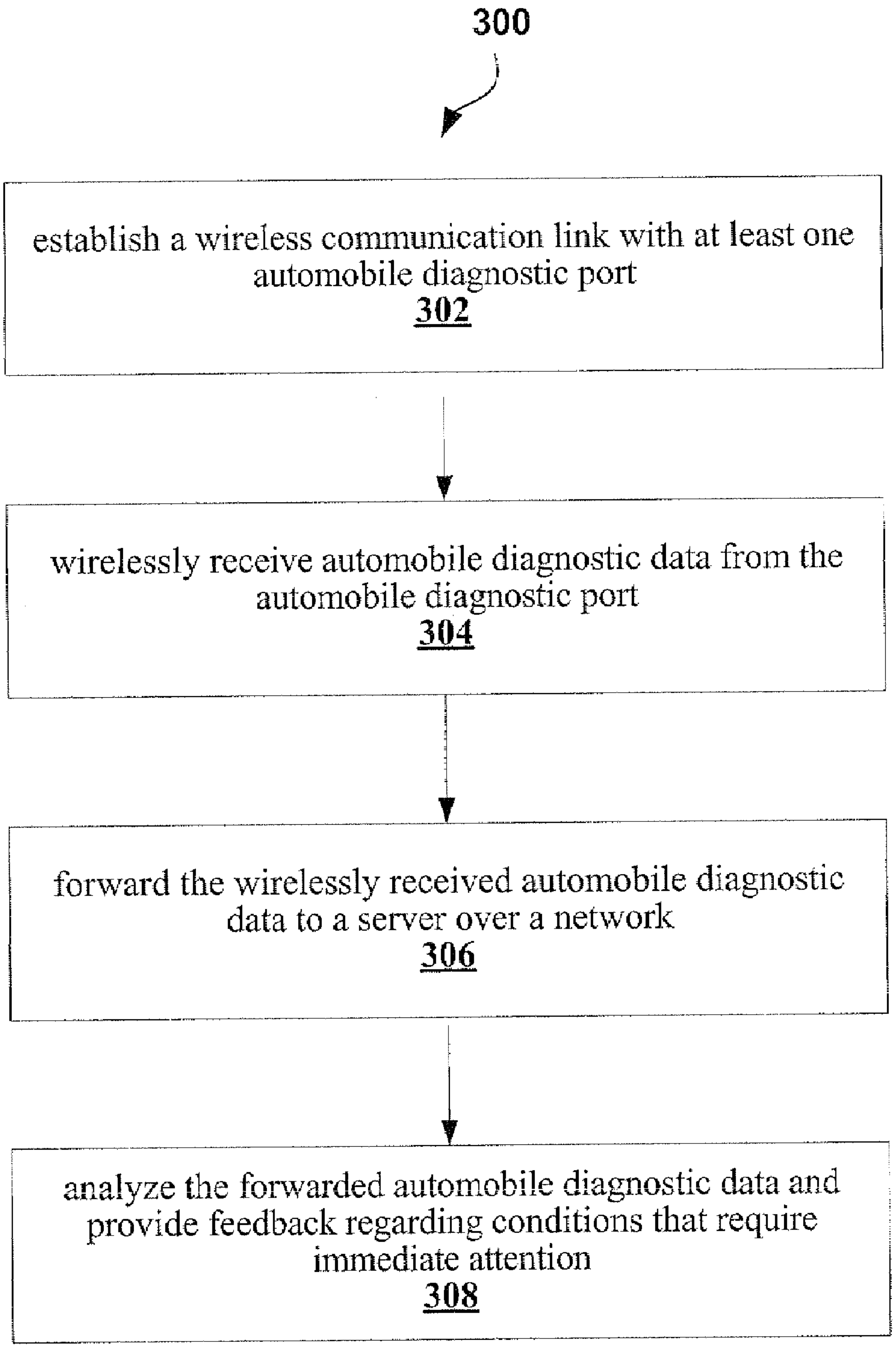
FIG. 3 illustrates a method associated with the present invention for forwarding automobile diagnostic data via a plurality of gateways dispersed at predetermined physical locations.

FIG. 3 illustrates method 300 associated with the present invention for forwarding automobile diagnostic data via a plurality of gateways dispersed at predetermined physical locations, wherein the method comprises the steps of: establishing a wireless communication link with at least one automobile diagnostic port 302; wirelessly receiving automobile diagnostic data from the automobile diagnostic port 304, wherein the automobile diagnostic data comprises a set of automobile diagnostic codes in conformity with a diagnostic standard; and forwarding the wirelessly received automobile diagnostic data to a server over a network (such as a WAN, LAN, or the Internet) 306, wherein the server analyzes the forwarded automobile diagnostic data and provides feedback 308 regarding conditions that require immediate attention.

As mentioned above, the specific locations at which such analyzed data can be received should not be used to limit the scope of the present invention.

In the preferred embodiment, the wireless communication is implemented via an IEEE 802.11-based protocol (i.e., 802.11a, 802.11b, 802.11, or 802.11g). Additionally, the network analyzer server and the gateways are able to communicate via any of the following networks: LANs, WANs, or the Internet. Also, the preferred standard for the diagnosis of automobile diagnostic data is the ODB2 standard.

Figure 4:
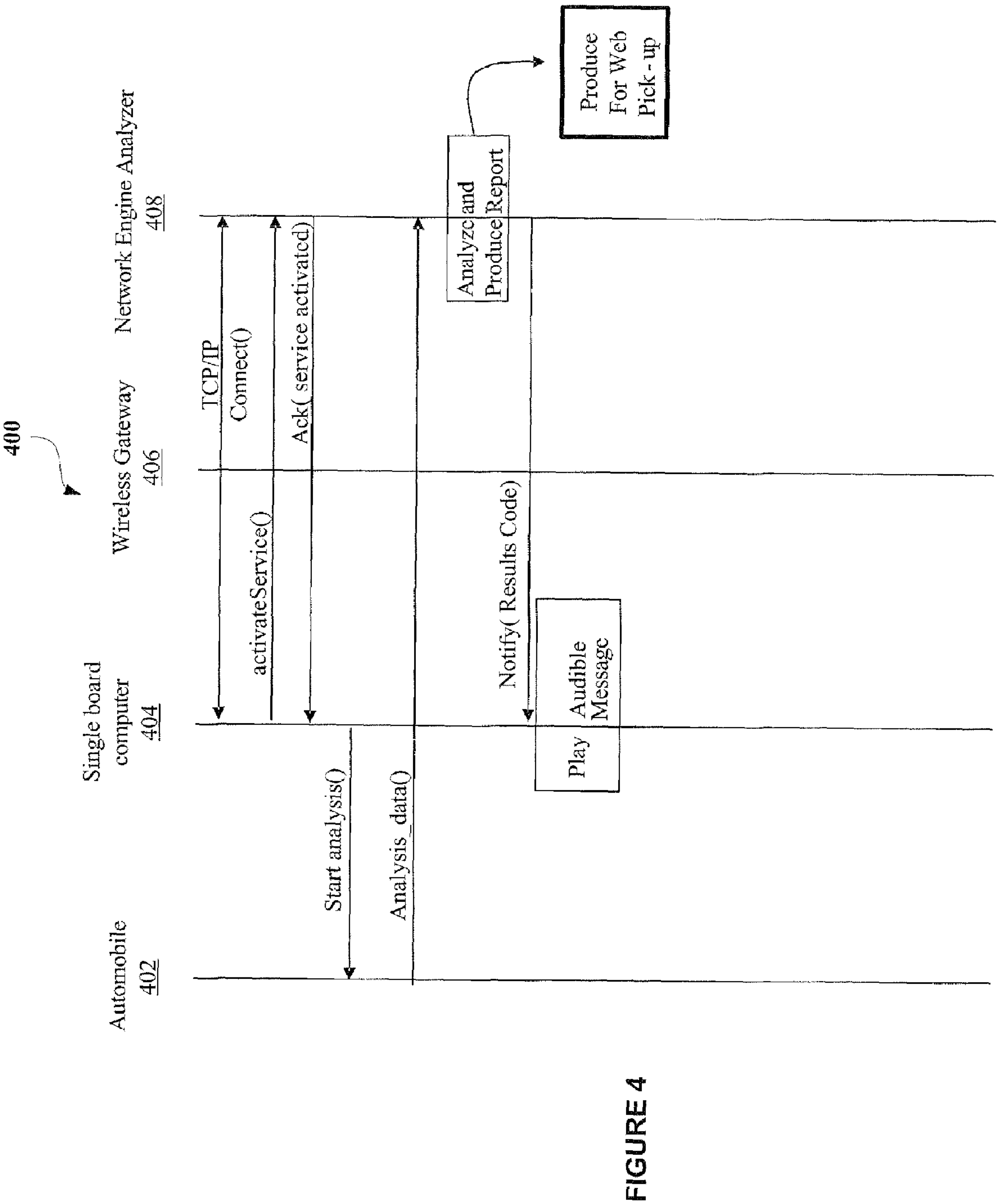
FIG. 4 illustrates a time-line diagram outlining the interactions between the automobile, the single board computer, the wireless gateway, and the network analyzer server.

FIG. 4 illustrates a time-line diagram 400 outlining the interactions between automobile 402, single board computer 404, wireless gateway 406, and network analyzer server 408. First, single board computer 404 establishes a communication session with network engine analyzer 408 via wireless gateway 406. Next, a set of messages are exchanged between the single board computer 404 and the network engine analyzer 408 regarding an acknowledgement for service activation. Upon reception of such an acknowledgement, automobile analysis is activated and the data for analysis is forwarded to the network engine analyzer 408. Lastly, network engine server 408 analyzes the forwarded data and produces a report for pick-up over a network such as the Internet. Optionally, an indication is rendered at the subscriber's end (e.g., an audible message is played in the automobile indicating the analyzed report is ready for pick-up over the Internet).

Conclusion

A system and method have been shown in the above embodiments for the effective implementation of a network car analyzer. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by type of wireless network, location for receiving analyzed data, software/program, computing environment, and/or specific hardware.

The above enhancements are implemented in various computing environments. For example, the present invention may be implemented on a conventional IBM PC or equivalent, multi-nodal system (e.g., LAN) or networking system (e.g., Internet, WWW, or wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of ODB compliant systems.

What is claimed is:

1. A plurality of gateways dispersed at predetermined physical locations offering one or more subscribers network based automobile diagnostic services, each gateway comprising:

a. a first interface in communication with a first wireless network, said first interface capable of establishing a wireless communication link over said first wireless network with at least one automobile diagnostic port to wirelessly receive automobile diagnostic data, said automobile diagnostic data comprising a set of automobile diagnostic codes in conformity with a diagnostic standard; and b. a second interface in communication with a second network, said second interface capable of forwarding said received automobile diagnostic data over said second network to a server, wherein said server receives and analyzes said forwarded automobile diagnostic data and provides feedback regarding conditions that require immediate attention.

2. A plurality of gateways dispersed at predetermined physical locations offering one or more subscribers network based automobile diagnostic services, as per claim 1, wherein said diagnostic standard is the open basic diagnostic 2 (OBD2) standard.

3. A plurality of gateways dispersed at predetermined physical locations offering one or more subscribers network based automobile diagnostic services, as per claim 1, wherein said wireless network implements communications based on the IEEE 802.11b protocol.

4. A plurality of gateways dispersed at predetermined physical locations offering one or more subscribers network based automobile diagnostic services, as per claim 1, wherein said second network is any of the following: local area network, wide area network, or the Internet.

5. A plurality of gateways dispersed at predetermined physical locations offering one or more subscribers network based automobile diagnostic services, each gateway comprising a plurality of interfaces, each interface capable of receiving and transmitting data via a specific protocol, said plurality of interfaces comprising at least:

a. a first interface capable of communicating with a first wireless network via the IEEE 802.11-based protocol, said first interface capable of establishing a wireless communication link over said first wireless network with at least one automobile diagnostic port to wirelessly receive automobile diagnostic data, said automobile diagnostic data comprising a set of automobile diagnostic codes in conformity with a diagnostic standard; and b. a second interface in communication with a second network via the TCP/IP protocol, said second interface capable of forwarding said received automobile diagnostic data over said second network, wherein said server receives and analyzes said forwarded automobile diagnostic data and provides feedback regarding conditions that require immediate attention.

6. A plurality of gateways dispersed at predetermined physical locations offering one or more subscribers network based automobile diagnostic services, as per claim 5, wherein said diagnostic standard is the open basic diagnostic 2 (OBD2) standard.

7. A plurality of gateways dispersed at predetermined physical locations offering one or more subscribers network based automobile diagnostic services, as per claim 5, wherein said wireless network implements communications based on the IEEE 802.11b protocol.

8. A plurality of gateways dispersed at predetermined physical locations offering one or more subscribers network based automobile diagnostic services, as per claim 5, wherein said second network is any of the following: local area network, wide area network, or the Internet.

9. A computer usable medium having computer readable program code embodied therein which to retrieve and forward automobile diagnostic data via a plurality of gateways dispersed at predetermined physical locations, said medium comprising:

a. computer readable program code aiding in establishing a wireless communication link with at least one automobile diagnostic port;

b. computer readable program code aiding in wirelessly receiving automobile diagnostic data from said automobile diagnostic port, said automobile diagnostic data comprising a set of automobile diagnostic codes in conformity with a diagnostic standard; and computer readable program code aiding in forwarding said wirelessly received automobile diagnostic data to a server over a network, said server analyzing said forwarded automobile diagnostic data and providing feedback regarding conditions that require immediate attention.

10. A computer usable medium having computer readable program code embodied therein to analyze automobile diagnostic data, said medium comprising:

a. computer readable program code aiding in receiving, over a network, automobile diagnostic data from a gateway located at a predefined location, said gateway wirelessly receiving said automobile diagnostic data from an automobile;

b. computer readable program code analyzing said received automobile diagnostic data and identifying indications of malfunction; and c. computer readable program code aiding in forwarding said identified indications of malfunction to one or more subscriber-defined locations, wherein said identified indications of malfunction are utilized at said one or more subscriber-defined locations in the diagnosis of automobile related mal-functions.

11. A computer usable medium having computer readable program code embodied therein to implement a plurality of interfaces to receive and transmit data via specific protocols, said medium comprising at least:

a. computer readable program code implementing a first interface to aid in communications with a first wireless network via the IEEE 802.11-based protocol, said first interface aiding in establishing a wireless communication link over said first wireless network with at least one automobile diagnostic port to wirelessly receive automobile diagnostic data, said automobile diagnostic data comprising a set of automobile diagnostic codes in conformity with the open basic diagnostic 2 (OBD2) standard; and b. computer readable program code implementing a second interface to aid in communications with a second network via the TCP/IP protocol, said second interface capable of forwarding said received automobile diagnostic data over said second network, wherein said server receives and analyzes said forwarded automobile diagnostic data and provides feedback regarding conditions that require immediate attention.

12. A computer usable medium having computer readable program code embodied therein to analyze automobile diagnostic data, said medium comprising:

a. computer readable program code aiding in receiving, over a network, automobile diagnostic data from a gateway located at a predefined location, said gateway wirelessly receiving said vehicle diagnostic data from an automobile;

b. computer readable program code analyzing said received automobile diagnostic data and identifying indications of malfunction; and c. computer readable program code generating a report with said identified indications of malfunction;

d. computer readable program code aiding in forwarding said identified indications of malfunction to a computer-based device with access to the Internet;

wherein said computer-based device accesses said report over the Internet to provide diagnosis of automobile related malfunctions.

13. A computer usable medium having computer readable program code embodied therein to analyze automobile diagnostic data, said medium comprising:

a. computer readable program code aiding in receiving, over a network, automobile diagnostic data from a gateway located at a predefined location, said gateway wirelessly receiving said vehicle diagnostic data from an automobile;

b. computer readable program code analyzing said received automobile diagnostic data and identifying indications of malfunction; and c. computer readable program code generating a report with said identified indications of malfunction;

rendering an indication in said automobile informing a user of said automobile that said report is ready for electronic retrieval.

14. A computer usable medium having computer readable program code embodied therein to analyze automobile diagnostic data, as per claim 13, wherein said electronic retrieval is over the Internet.

15. A computer usable medium having computer readable program code embodied therein to analyze automobile diagnostic data, as per claim 13, wherein said indication is an audio message.

16. A computer usable medium having computer readable program code embodied therein to analyze automobile diagnostic data, as per claim 13, wherein said indication is a visual indicator.

* * * * *